UNITED STATES PATENT OFFICE.

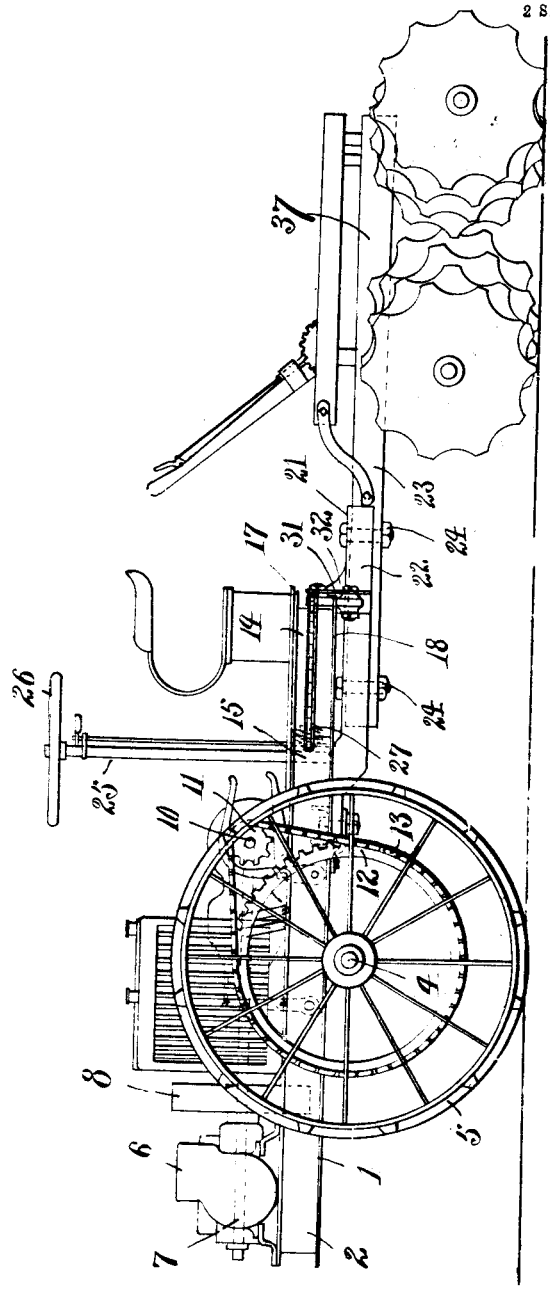

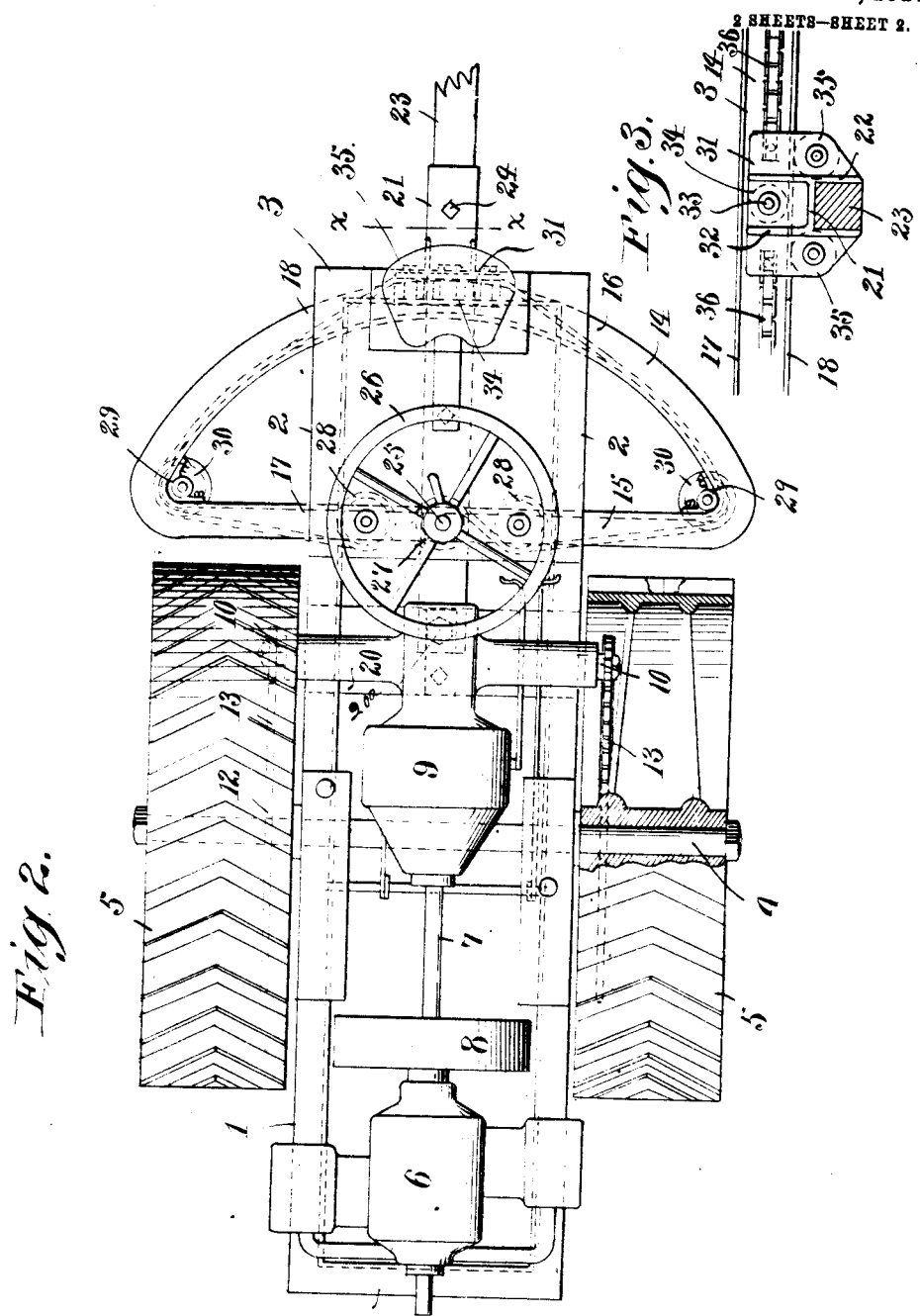

HENRY J. STEGEMAN, OF BRIDGEPORT, CONNECTICUT, ASSIGNOR OF ONE-HALF TO WILLIAM J. PERRY, OF BRIDGEPORT, CONNECTICUT.

TRACTOR.

1,087,332.      Specification of Letters Patent.    Patented Feb. 17, 1914.

Application filed September 20, 1911, Serial No. 650,355. Renewed July 8, 1913. Serial No. 777,959.

*To all whom it may concern:*

Be it known that I, HENRY J. STEGEMAN, a citizen of the United States, and resident of Bridgeport, in the county of Fairfield and State of Connecticut, have invented certain new and useful Improvements in Tractors, of which the following is a specification.

This invention relates to that class of devices known as tractors, and has for its object to provide a device of this character especially adapted for use in connection with agricultural implements, such as plows, harvesting machines, harrows and the like, and in fact may be employed for use in connection with any type of field or road machine having a tongue for drawing same.

A further object of the invention is to provide a device of this character with new and novel means for guiding the same and whereby it may be turned in very small spaces, as, for instance, at the ends of rows through which it may have been driven.

With these and other objects in view the invention consists in the construction and novel combination of parts hereinafter fully described, illustrated in the accompanying drawings, and pointed out in the claims hereto appended, it being understood that various changes in the form, proportion, size and minor details of construction within the scope of claims may be resorted to without departing from the spirit or sacrificing any of the advantages of the invention.
Similar characters of reference denote like or corresponding parts throughout the several figures of the accompanying drawing forming a part of this specification, and upon which, Figure 1 is a side elevation of my improved tractor, a disk plow being coupled thereto as in use. Fig. 2 is a top plan view of the tractor; and Fig. 3 is a sectional elevation taken across the front draw bar on line *x—x* of Fig. 2.

In designing my improved tractor I have endeavored to obviate the difficulties heretofore existing in machines of this sort, and which include constructions requiring considerable room for turning, but which was not always available in small places. Besides many of these devices are found to be expensive and not adapted to be hitched to the common form of farm implement without special fittings of some sort. With my device I am enabled to connect on to most any form of implement to which a pair of horses could be attached and likewise can turn when so hitched in equally as small a space as the horses could turn with the implement. The coupling of my tractor is adapted to receive a pole or tongue of the ordinary wagon, plow, harrow or the like and can readily be attached or detached by the use of a couple of bolts. It will be noted that the tractor includes but two wheels, the implement to which it is attached forming the third or fourth bearing or support. Thus the pivotal point upon which the attached implement swings is formed upon the tractor in rear of its axle and whereby the connected cultivator or other device is permitted to make very short turns.

Referring to the drawings, the numeral 1 designates a frame, the same consisting of side bars 2, end sills 3 and intermediate cross piece 20. The frame 1 is supported intermediate the end sills 3 upon a suitably supported axle 4, and upon each end of which is mounted traction wheels 5.

Mounted upon the forward end of the frame is an internal combustion engine 6, of any well known construction, and provided with a longitudinally arranged shaft 7 upon which is fixed a fly wheel 8, said shaft having its inner end coupled to a transmission gear contained in the casing 9. A pair of transversely arranged shafts 10 are mounted upon the frame, the opposing ends of which are suitably coupled to a differential also contained in the casing 9, said gearing being of the usual type, the operation of which will be apparent to those skilled in the art. To the outer end of each shaft 10 is fixed a sprocket 11, and to each traction wheel 5 is secured a sprocket band 12, the same being greater in diameter than the sprockets 11. Adapted to pass partially around the sprockets 11 and bands 12 are sprocket chains 13, and when rotation is imparted to the shafts 10 the wheels will revolve, thereby propelling the tractor across the field to draw the implement coupled thereto.

Rigidly connected to the rear end of the frame 1 is a guide member 14, the same consisting of a transversely arranged bar 15 and an arcuate section 16, both of which are provided with upper and lower outwardly extending flanges 17 and 18, respectively, which form the said guideway 14.

A draw bar 21 is pivoted to the cross piece 20 of the frame at 20ᵃ which pivotal point is located back of the before mentioned axle 4 so as to insure the rear member tracking or following the wheels of the tractor and whereby the connected tractor and cultivator are permitted to make short turns. The draw bar is formed with spaced parallel side flanges 22 and is provided with a pair of alined openings, whereby a tongue 23 of an agricultural implement or vehicle may be detachably coupled by passing bolts 24 therethrough.

A steering shaft 25 is provided, to the upper end of which is fixed a hand wheel 26 for operating the same. Fixed to the lower end of the shaft 25 is a sprocket 27, the same being supported upon the lower flange 18 and in the guideway 14. Arranged upon both sides of the sprocket 27 are guide sheaves 28. Secured at the intersection of the transverse bar 15 and arcuate section 16 are bearings 29 and in which are journaled the shafts of guide sheaves 30, portions of which project into the guideway 14.

Formed integral with the draw bar 21, and near the rear end thereof is a plate 31, the same being braced by webs 32, said plate being adapted to travel upon the arcuate section 16 in a manner to be hereinafter described.

A stub shaft 33 is mounted upon the inner face of the plate 31, and near the upper edge thereof, and upon which is mounted an anti-friction roller 34, said roller being adapted to travel in the guideway 14 and upon the lower flange 18 of the arcuate section 16. A pair of similarly mounted anti-friction rollers 35 are secured near the lower edge of the plate 31, the same being adapted to bear against the under surface of the lower flange 18.

A sprocket chain 36 is provided and has its opposite ends secured to the opposite sides of the plate 31, said chain passing partially around the guide sheaves 30 and 28 and sprocket 27, but engaging said sprocket at the side opposite to that of its engagement with the guide sheaves.

When the tractor is in operation and it is desired to guide or turn the disk plow 37, it is only necessary that the shaft 25 be rotated, and by the engagement of the sprocket 27 with the chain 36, said chain will travel in the guideway 14 and over the guide sheaves, thereby pulling upon the plate 31, to guide the tractor in the desired direction.

Having thus described the invention, what is claimed as new is:—

1. A two wheel tractor of the class described, the same comprising a frame, a draw bar fulcrumed to the rear part thereof, steering mechanism mounted wholly upon the tractor frame and between the fulcrum and draw bar and adapted to actuate the bar as a rudder and to be operated from the tractor.

2. In a two wheel tractor of the class described, a steering mechanism comprising in part a draw bar pivoted wholly to a part of the tractor rear of its axle, an arcuate guide to support the free end of the said draw bar, and steering means upon the tractor frame forward of the guide for actuating the draw bar from said tractor frame.

3. In a two wheel tractor of the class described, a draw bar fulcrumed wholly to the rear part of the tractor frame and having detachable means for its attachment to a tongue or pole of a vehicle to be drawn, steering mechanism mounted wholly upon the tractor frame and to the rear of the pivot of the draw bar with the frame for actuating the same by throwing the pivot to either side of the line of draft of the connected implement and whereby the same is simultaneously turned in different directions.

4. In a two wheel tractor, the combination with a fixed frame, of a draw bar pivoted to the rear part of the tractor frame and adapted for attachment to a third support to balance the tractor, a steering device mounted wholly upon the tractor frame and to the rear of the pivot of the draw bar with the frame to actuate the same by throwing the pivot to either side to determine the course of the tractor, and a guide attached to the frame and to the rear of the steering device.

5. In a two wheel tractor, the combination with a frame, an axle and two wheels for supporting the same, a motor and intermediate mechanism to drive the wheels, a draw bar fulcrumed to the rear part of the frame, an arcuate guide attached to the frame to carry the free end of the draw bar, antifriction rolls mounted in said guide, a steering device mounted upon the frame to actuate the draw bar like a rudder from the frame of the tractor.

6. The combination with a tractor including a fixed frame supported upon an axle and two wheels, of a draw bar pivotedly connected to the rear part of said fixed frame and having a longitudinal opening therethrough adapted for detachable connection with the tongue of an agricultural implement or vehicle, a steering wheel mounted directly on said fixed frame and connections with the wheel for moving the draw bar beneath the frame to guide or turn the tractor and connected implement or vehicle.

7. A tractor including a frame, an axle and but two wheels for supporting same, of an arcuate guide secured to the frame, a steering draw bar pivotedly connected to the part of the tractor located to the rear of the said axle and connected with and guided by the guide, said bar being adapted for detachable connection with the tongue of an agricultural implement or vehicle, a steering wheel mounted in said frame, and chains connected from the steering device to the opposite sides of the draw bar to guide or turn the tractor and connected implement.

8. A two-wheel tractor including a frame, a draw bar pivotally connected to the rear part thereof and adapted to be detachably connected with a tongue of a vehicle, a steering wheel mounted wholly upon the frame and forward of the draw bar so that the wheel always remains in line with the movement of the tractor, and rearwardly disposed connections from the steering wheel to the draw bar for guiding the tractor.

9. In a tractor, the combination with a draw bar pivotally connected to the rear portion of the tractor and adapted for detachable connection with a tongue of an agricultural implement, a plate secured to the draw bar, a guide member mounted on the tractor and consisting of an arcuate section provided with a guideway and anti-friction rollers carried by the plate and adapted to travel in said guideway, and means connected with the plate for moving the draw bar and plate in opposite directions to guide the tractor and implement.

10. In a two wheel tractor, the combination with a pivotally connected draw bar adapted for detachable connection with a tongue of an agricultural implement, side plates formed integral with the draw bar, a guide member mounted on the tractor and consisting of an arcuate section provided with a guideway, an anti-friction roller carried by each of said plates and adapted to travel in said guideway, chains connecting the plates for moving the draw bar and plates in opposite directions, and a steering wheel carried by the tractor to guide the same with relation to its draw bar.

11. In a tractor, the combination with a pivotally connected draw bar adapted to be connected with the tongue of an agricultural implement, of a plate formed integral with said draw bar, a guide member mounted on the rear end of the tractor and consisting of a transverse bar and an arcuate section, said bar and section being provided with flanges to form a guideway, a sprocket mounted in the guideway of the transverse bar, guide sheaves mounted in said guideway and upon each side of said sprocket, a sprocket chain having its opposite ends secured to said plate, anti-friction rollers carried by said plate, one of which being adapted for travel in the guideway of the arcuate section and upon the flange thereof, the others being adapted to travel upon the underside of the flange of said section, said chain passing partially around guide sheaves mounted at the intersections of the transverse bar and arcuate section and guide sheaves arranged at each side of said sprocket, said chain engaging with the sprocket upon sides opposite to its engagement with the guide sheaves, whereby when the sprocket is rotated the chain will impart movement to the plate to move the draw bar, thereby turning or guiding the tractor.

12. In a two wheel tractor, the combination of a frame mounted to be carried in the same relative alinement of the wheel, a guide member mounted upon the tractor frame and consisting of an arcuate section provided with guideways, a draw bar pivoted at one end to the frame and having its free end portion connected with the guide, a steering wheel also mounted upon said frame and arcuate guide section, a chain mounted in the guideway and connecting the steering wheel with the opposite sides of the draw bar whereby the latter may be moved to either side with relation to the frame.

13. In a two wheel tractor, the combination of a frame mounted to be carried in the same relative alinement of the wheels, a guide member mounted upon the frame, a steering wheel mounted upon the frame and forward of the guide, a draw bar pivotally connected to the rear part of the frame and connected and guided by the guide, and means connecting the steering apparatus and draw bar whereby the latter is moved sidewise beneath the guide and with relation to the said frame.

14. In a two wheel tractor, the combination with a frame mounted to be carried in the same relative alinement of the wheels, a guide member mounted upon the frame, a steering wheel mounted upon the frame, a draw bar pivotally connected to the rear part of the frame and slidably attached to the guide, a chain operated by the steering device and connected with the draw bar at a point back of the steering device carried upon the fixed frame.

15. In a two wheel tractor, the combination with a frame mounted to be carried in the same relative alinement as the wheels, a guide member mounted upon the frame, a draw bar pivotally connected to the rear part of the frame and slidably attached to the guide, a steering device mounted upon the tractor frame and forward of the guide, a chain operated by the steering device and connected with the draw bar at a point back of the steering device.

Signed at Bridgeport in the county of Fairfield and State of Connecticut this 16th day of September A. D., 1911.

HENRY J. STEGEMAN.

Witnesses:
C. M. NEWMAN,
RUTH M. WORDEN.